United States Patent

[11] 3,628,827

| [72] | Inventors | James A. Bailey<br>Idaho City, Idaho 83631;<br>Harry E. Turner, 1509 North 18th, Boise,<br>Idaho 83702 |
|---|---|---|
| [21] | Appl. No. | 11,242 |
| [22] | Filed | Feb. 13, 1970 |
| [45] | Patented | Dec. 21, 1971 |

[54] VEHICLE COVER
2 Claims, 4 Drawing Figs.

[52] U.S. Cl. ................................................ 296/137
[51] Int. Cl. ................................................ B60j 7/06
[50] Field of Search ................................................ 296/98, 100, 137 R, 137 B, 137 E, 155; 135/7.1 R, 7.1 A, 7.1 B; 160/201

[56] References Cited
UNITED STATES PATENTS

| 639,145 | 12/1899 | Butler | 296/100 X |
| 733,526 | 7/1903 | Wortley | 296/98 |
| 1,318,820 | 10/1919 | Watkins | 296/98 |
| 2,650,858 | 1/1953 | Lange | 296/155 |
| 2,914,775 | 12/1959 | Kauffman | 106/201 X |
| 3,135,544 | 6/1964 | Mickey et al. | 106/201 X |
| 3,140,116 | 7/1964 | Speas | 296/137 B X |
| 3,326,597 | 6/1967 | Barker | 296/100 |
| 3,363,938 | 1/1968 | Schultz | 296/100 |

*Primary Examiner*—Benjamin Hersh
*Assistant Examiner*—Winston H. Douglas
*Attorney*—John W. Kraft ABSTRACT: The vehicle cover of this invention comprises a framework assembly carried in stake pockets provided in truck body beds and a canopy slidably carried thereby. The canopy includes latching means operable to engage the opposite sides of the truck body to hold the canopy under tension over the framework assembly to the truck body bed. The canopy is operable to slide over the framework assembly much like a roll top desk to provide access to a truck body bed at respective sides thereof.

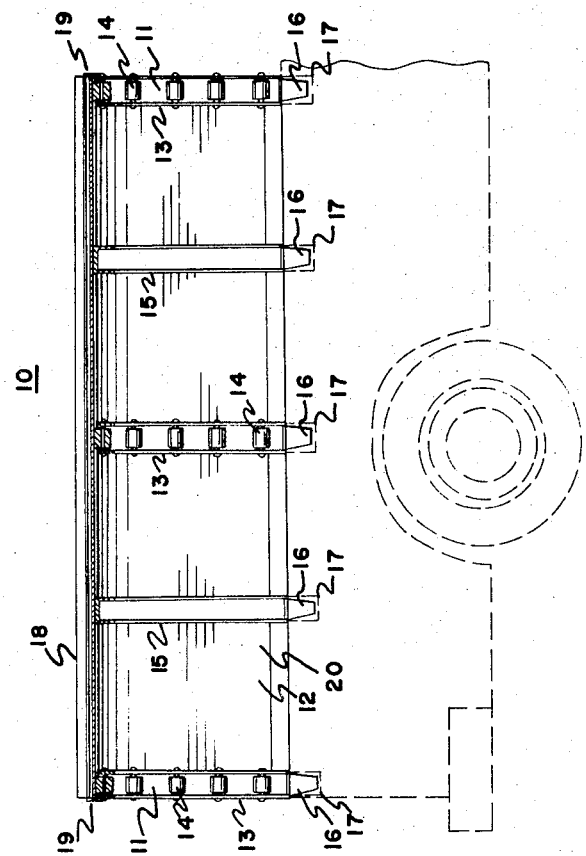
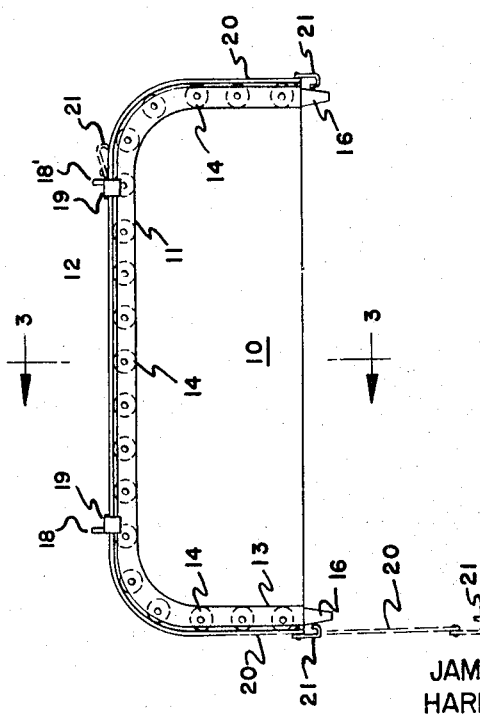

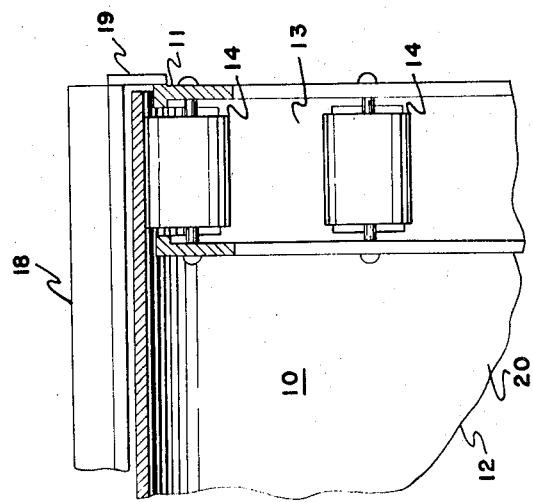
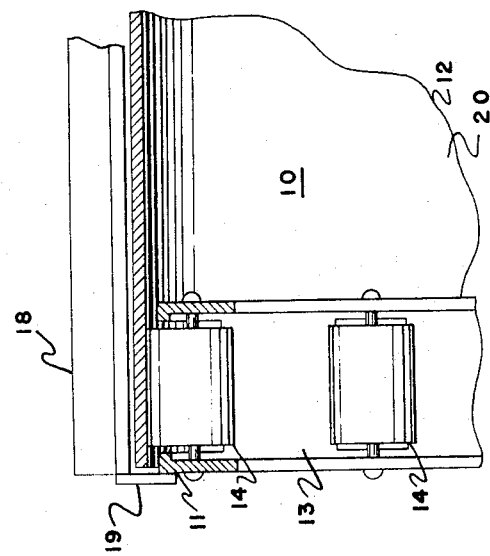
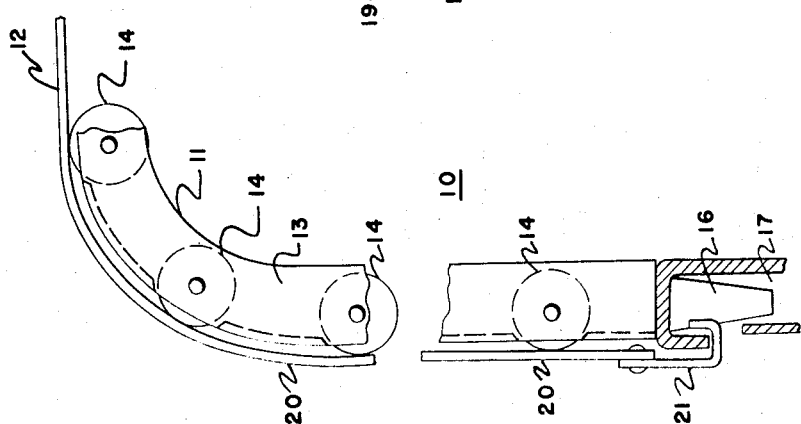
FIG. 3
FIG. 4
JAMES A. BAILEY  INVENTOR
HARRY E. TURNER
BY

VEHICLE COVER

FIELD OF INVENTION

This invention relates to vehicle covers and more particularly to vehicle covers for truck body beds.

DESCRIPTION OF THE PRIOR ART

Vehicle covers for truck bodies generally fall into two categories, namely rigid prefabricated body assemblies and temporary weather covers usually consisting of sheets of fabric which are tied to the bed. In the latter category, hooplike stakes are mounted in stake pockets provided in the truck bed and are sometimes used to support the fabric sheets. In the former category are included prefabricated workboxes for tools mounted on the opposite sides of the truck body beds which sometimes include a roof portion disposed between the opposing workboxes. Access to the truck bed is generally limited to the rearwardmost tailgate portion of the truck body bed thereby making access difficult.

Accordingly it is an object of the present invention to provide a vehicle cover in which access to the truck body bed may be had from either of the opposite sides.

Another object of this invention is to provide in a vehicle cover means by which the canopy portion thereof may be rolled from either side to permit access to the truck body bed.

A further object of this invention is to provide an inexpensive and simple vehicle cover which at the same time provides security for the vehicle.

These and other objects shall become apparent to those skilled in the art from the description hereinafter set out.

SUMMARY OF INVENTION

The present invention generally comprises a framework assembly including a plurality of hooplike stakes coincident with and carried by stake pockets provided in a truck body bed and a canopy slidably carried by the framework assembly, and including latching means at the opposite terminal sides of the canopy operable to engage the opposite sides of the truck body bed to hold the canopy under tension over the framework assembly and to the truck body bed. Means are provided on the framework assembly to limit movement of the canopy when released from either of the sides of the truck body bed. The canopy is intended to operate much like a roll top desk. It has been found in practice that the canopy may be fabricated from a flexible sheetlike fabric. However, interlocking hingedly mounted strips of rigid or semirigid material forming a canopy may be advantageously employed to provide additional security for the truck body bed enclosed by the vehicle cover.

A more thorough and comprehensive understanding may be had from the detailed description of the preferred embodiment following when read in connection with the drawings forming a part of this specification.

BRIEF DESCRIPTION OF DRAWINGS

FIG. 1 is a cross section side elevational view of the vehicle cover of the present invention shown in the environment of a utility truck vehicle shown in dotted lines for illustrative purposes.

FIG. 2 is an end elevational view of the vehicle cover also showing in dotted lines one of the positions of the canopy portion of the invention when the canopy portion is released from the vehicle body for access to the truck body bed.

FIG. 3 is a fragmentary cross section elevational view to a larger scale taken substantially along the lines 3—3 of FIG. 2 showing details of construction and assembly of the vehicle cover.

FIG. 4 is a fragmentary cross section end elevational view to a larger scale showing details of latching means of this invention.

DESCRIPTION OF PREFERRED EMBODIMENT

Referring now to the drawings and more particularly to the FIG. 1 which shows to advantage a cross section side elevational view of the vehicle cover of this invention generally identified by the numeral 10. The vehicle cover 10 is shown in the environment of a utility truck vehicle shown in dotted lines for illustrative purposes. It is to be understood that the vehicle cover here disclosed may be adapted to any of a variety of truck bodies.

The vehicle cover 10 comprises a framework assembly 11 and a weather cover assembly 12. The cover assembly 12 is preferably fabricated from flexible or pliable materials.

The framework assembly 11 includes a plurality of hooplike stake members 13 having a multiplicity of rollers 14 journaled for rotation therein and a plurality of intermediate stake members 15. The stake members 13 and 15 may be formed from channel steel shapes. Each of the stake members 13 and 15 are provided with pointed end mounting portions 16 at the opposite terminal ends of the stake members operable to be mounted into stake pockets 17 usually provided in truck body frames. Hence, each of the stake members 13 and 15 are coincident with and carried by the pockets 17. A pair of longitudinal canopy stop members 18 and 18' mounted rectilinearly to the stake members 13 and 15. The canopy stop members 18 and 18' are carried by a pair of brackets 19 provided at the respective opposite terminal ends of the canopy stop members 18 and 18'. The brackets 19 are suitably fastened to respective stake members 13 and the opposite terminal ends of the framework assembly 11 so that the longitudinal canopy stop members 18 and 18' are spaced apart from the stake members 13 and 15.

The canopy 12 comprises a flexible sheetlike body portion 20 having a pair of longitudinally mounted hooklike members 21 and 21' rectilinearly extending along the opposite terminal edges of the body portion 20. The body portion is disposed between the stakes 13 and 15 and the longitudinal canopy stop members 18 and 18' of the framework assembly 11. Referring now to the FIG. 2, the canopy body portion 20 is shown to advantage mounted on the rollers 14 and the stake members 13 and 15. The canopy 12 is also shown in dotted lines to illustrate the position of the hook portions 21 and 21' and of the canopy body portion 20 when one of the hook portions is released from the truck body as hereinafter later described. FIG. 3 shows to advantage the detail assembly of canopy 12 and the framework assembly 11.

Referring now to the FIG. 4 which advantageously shows the hook portion 21 engaging the sidewall return of a commonly known truck body. In practice it is intended that the canopy 12 be normally stretched over the frame assembly 11 and locked by the hook portions 21 and 21' to the body of the truck vehicle. In order to gain access from either of the sides of the truck body one of the hook members 21 or 21' is manually forced downwardly away from the truck body to be released therefrom and the canopy 12 is caused to be pulled over the rollers 14 of the stake members 13 by the weight of the other hook member. Movement of the canopy 12 is limited by the respective longitudinal canopy stop members 18 and 18'.

Having thus described in detail a preferred apparatus which embodies the concepts and principles of the invention and it is to be appreciated and will be apparent to those skilled in the art, that many physical changes could be made in the apparatus without altering the inventive concepts and principles embodied therein. Hence, it is intended that the scope of the invention be limited only to the extent indicated in the appended claims.

We claim:

1. In a vehicle cover of the character described a framework assembly carried in stake pockets provided in a truck body bed, a canopy portion slidably carried by said framework assembly, latching means mounted on the opposite terminal edges of said canopy portion operable to engage the respective opposite terminal sides of a truck body bed and to hold said canopy under tension on said framework assembly and to said bed, said framework assembly comprising a plurality of hooplike stake members carried by said stake pockets, a pair of longitudinal rectilinearly disposed canopy stop members carried by brackets at the respective terminal ends of said canopy stop members, said canopy stop members being suitably fastened to respective stake members at the opposite terminal ends of said truck body bed, said canopy being disposed between said canopy stop members and said stake members and being operable to be slidably manually moved on said stake members.

2. The article of claim 1 in which said stake members include a multiplicity of rollers journaled for rotation in said stake members.

* * * * *